US010498505B2

(12) United States Patent
Jin et al.

(10) Patent No.: US 10,498,505 B2
(45) Date of Patent: Dec. 3, 2019

(54) METHOD OF TRANSMITTING TRANSMISSION CHANNEL STATE INFORMATION, AND DEVICE, BASE STATION AND TERMINAL UTILIZING SAME

(71) Applicant: CHINA MOBILE COMMUNICATIONS GROUP CO., LTD., Beijing (CN)

(72) Inventors: Jing Jin, Beijing (CN); Hui Tong, Beijing (CN); Dan Wu, Beijing (CN); Fei Wang, Beijing (CN); Qixing Wang, Beijing (CN)

(73) Assignee: China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 15/772,885

(22) PCT Filed: Sep. 2, 2016

(86) PCT No.: PCT/CN2016/097939
§ 371 (c)(1),
(2) Date: May 2, 2018

(87) PCT Pub. No.: WO2017/076120
PCT Pub. Date: May 11, 2017

(65) Prior Publication Data
US 2018/0323924 A1 Nov. 8, 2018

(30) Foreign Application Priority Data
Nov. 4, 2015 (CN) .......................... 2015 1 0741920

(51) Int. Cl.
*H04L 5/00* (2006.01)
*H04B 7/10* (2017.01)
(Continued)

(52) U.S. Cl.
CPC ......... *H04L 5/0048* (2013.01); *H04B 7/0469* (2013.01); *H04B 7/10* (2013.01);
(Continued)

(58) Field of Classification Search
None
See application file for complete search history.

(56) References Cited

U.S. PATENT DOCUMENTS 8,885,739 B2 * 11/2014 Noh ...................... H04L 1/0026
375/260
2012/0020230 A1 * 1/2012 Chen .................... H04L 1/0028
370/252
(Continued)

FOREIGN PATENT DOCUMENTS

CN 101562504 A 10/2009
CN 102378114 A 3/2012
(Continued)

OTHER PUBLICATIONS

English translation of International Search Report and Written Opinion issued in PCT/CN2016/097939, dated Nov. 30, 2016.
(Continued)

*Primary Examiner* — Brian S Roberts
(74) *Attorney, Agent, or Firm* — BakerHostetler

(57) ABSTRACT

The disclosure provides a method of transmitting transmission channel state information, and device, base station and terminal utilizing the same. The method comprises: transmitting, by 16 channel state information reference signal (CSI-RS) ports, CSI-RSs, wherein the CSI-RSs are mapped to a resource element (RE) set in CSI-RS pilot patterns, the RE set comprises REs mapping to 2 sets of 8 CSI-RS ports, a first set of CSI-RS port serial numbers and a second set of the CSI-RS port serial numbers in the 16 CSI-RS ports are mapped to REs mapping to a first set of the 8 CSI-RS ports
(Continued)

in the 2 sets of the 8 CSI-RS ports, and a third set of CSI-RS port serial numbers and a fourth set of the CSI-RS port serial numbers in the 16 CSI-RS ports are mapped to REs mapping to a second set of the 8 CSI-RS ports in the 2 sets of the 8 CSI-RS ports; and measuring, by a receiving end, according to the CSI-RSs, channel state information. The embodiments of the disclosure can reduce repeated CSI-RS overheads, while increasing accuracy of a CSI measurement comparing to a conventional terminal, enhancing performance of a base station.

16 Claims, 14 Drawing Sheets

(51) Int. Cl.
  *H04B 7/0456* (2017.01)
  *H04L 5/04* (2006.01)
(52) U.S. Cl.
  CPC .......... *H04L 5/0023* (2013.01); *H04L 5/0053* (2013.01); *H04L 5/04* (2013.01); *H04L 5/0082* (2013.01); *H04L 5/0091* (2013.01)

(56) References Cited

U.S. PATENT DOCUMENTS

| | | | |
|---|---|---|---|
| 2012/0106374 A1* | 5/2012 | Gaal | H04L 5/0048 370/252 |
| 2012/0120905 A1 | 5/2012 | Ko et al. | |
| 2012/0127945 A1 | 5/2012 | Ko et al. | |
| 2012/0127963 A1 | 5/2012 | Ko et al. | |
| 2012/0134334 A1 | 5/2012 | Ko et al. | |
| 2012/0176939 A1* | 7/2012 | Qu | H04L 5/0023 370/255 |
| 2012/0243500 A1 | 9/2012 | Chandrasekhar et al. | |
| 2013/0070719 A1 | 3/2013 | Xu et al. | |
| 2013/0094384 A1* | 4/2013 | Park | H04B 7/0626 370/252 |
| 2013/0308714 A1 | 11/2013 | Xu et al. | |
| 2014/0079146 A1 | 3/2014 | Kim et al. | |
| 2014/0140327 A1 | 5/2014 | Ko et al. | |
| 2014/0198871 A1 | 7/2014 | Ko et al. | |
| 2014/0334453 A1 | 11/2014 | Ko et al. | |
| 2015/0078345 A1 | 3/2015 | Ko et al. | |
| 2015/0155986 A1 | 6/2015 | Ko et al. | |
| 2015/0257132 A1 | 9/2015 | Park et al. | |
| 2016/0204845 A1 | 7/2016 | Kim et al. | |

FOREIGN PATENT DOCUMENTS

| | | |
|---|---|---|
| CN | 102396198 A | 3/2012 |
| CN | 101924610 A | 12/2012 |
| CN | 103391153 A | 11/2013 |
| CN | 103391179 A | 11/2013 |
| CN | 103944685 A | 7/2014 |
| CN | 104335501 A | 2/2015 |
| CN | 104412678 A | 3/2015 |
| CN | 104485984 A | 4/2015 |
| CN | 104641572 A | 5/2015 |
| CN | 104767592 A | 7/2015 |

OTHER PUBLICATIONS

Partial Supplementary Search Report issued in European Application No. 16861389.1, dated May 28, 2019.
"Discussion on non-precoded CSI-RS-based scheme for EBF/FDMIMO" Fujitsu, 3GPP TSG RAN WG1 Meeting #81 Fukuoka, Japan, May 25-29, 2015, Agenda Item: 6.2.5.2.2, R1-152656, XP050972289, downloaded by EPO on May 24, 2015, 6 Pages.
"High-level design principles for CSI-RS enhancements" CATT, 3GPP TSG RAN WG1 Meeting #82 Beijing, P.R. China, Aug. 24-28, 2015, Agenda Item: 7.2.5.2.1, R1-153932, XP051001362, downloaded by EPO on Aug. 24, 2015, 4 Pages.
"NZP CSI-RS configuration and RE mapping for class A CSI reporting" Samsung, 3GPP TSG RAN WG1 Meeting #82bis, Malmö, Sweden, Oct. 5-9, 2015, Agenda item: 7.2.4.2.1, R1-155483, XP051039661, downloaded by EPO on Oct. 4, 2015, 8 Pages.
"WF on CSI-RS Configuration for Class A Reporting" Samsung, 3GPP TSG RAN WG1 #82bis Malmö, Sweden, Oct. 5-9, 2015, Agenda item: 7.2.4.2.1, RI-156142, XP051045083, downloaded by EPO on Oct. 7, 2015, 6 Pages.
Extended Search Report issued in European Application No. 16861389.1, dated Oct. 1, 2019.

\* cited by examiner

METHOD OF TRANSMITTING TRANSMISSION CHANNEL STATE INFORMATION, AND DEVICE, BASE STATION AND TERMINAL UTILIZING SAME

CROSS-REFERENCE TO RELATED APPLICATIONS

The present application is a National Stage of International Patent Application No. PCT/CN2016/097939, filed Sep. 2, 2016, and claims priority to Chinese Patent Application No. 201510741920.3, filed on Nov. 4, 2015, the contents of which are hereby incorporated by reference in their entirety.

TECHNICAL FIELD

The disclosure relates to the field of wireless technologies, and particularly to a Channel State Information-Reference Signal (CSI-RS) sending method and device, a base station and User Equipment (UE).

BACKGROUND

Communication systems in a related technology, for example, Long Term Evolution (LTE) and Worldwide Interoperability for Microwave Access (WiMax) and 802.11n, all adopt a 2nd-Dimensional (2D) Multiple-Input Multiple-Output (MIMO) technology, of which a basic principle is to improve transmission quality and increase a system capacity by a degree of freedom of a 2D space on a horizontal plane. Along with development of an antenna design architecture, for improving transmission efficiency of a mobile communication system and improving a user experience, it is necessary to fully explore a degree of freedom of a perpendicular space to extend the 2DMIMO technology to a 3rd-Dimensional (3D) MIMO technology and improve system performance by fully utilizing a degree of freedom of a 3D space.

A 2DMIMO antenna architecture adopts multiple array elements in a perpendicular dimension, thereby obtaining a higher antenna gain. While each antenna array element in the perpendicular dimension adopts a fixed weight to ensure that a required beam pattern is obtained in the perpendicular dimension. Therefore, it is impossible for the 2DMIMO technology to implement beamforming in the perpendicular dimension.

For fully utilizing a MIMO technology in the perpendicular dimension, 3DMIMO may control weighting factors of different antenna array elements in the perpendicular dimension to form different beams. The beams in the perpendicular dimension may be effectively distinguished, thereby providing multiple-user multiplexing in the perpendicular dimension and increasing a capacity. An LTE system supports a design of maximally 8 antennae, and 3D MIMO extends a channel number of an antenna, and supports a 3D antenna form with a channel number of 16, 32, 64, 128 and the like.

In an existing standard, there are multiple CSI-RS patterns. For example, in a 2-port Frequency Division Duplexing (FDD) system, there are 20 patterns, and the specific CSI-RS pattern to be adopted is notified to UE through high-layer signaling. In each pattern, CSI-RSs are sent through each resource block of the whole bandwidth. Herein, as shown in FIG. 1, there are 5 patterns in an 8-port (numbered to be 0, 1, 2, 3, 4, 5, 6 and 7 respectively and corresponding to CSI-RS port serial numbers 15~22) FDD system, herein a set of cells with the same mark (for example, "\" and "/") represents a pattern.

UE in the related technology feeds back Channel State Information (CSI) according to CSI-RS channel estimation. For an 8-antenna system in the related technology, a codebook set defined in a standard is optimally designed according to an 8-polarized-antenna form. 8 dual-polarized antennae in a horizontal dimension are considered. A numbering rule is usually as follows: as shown in FIG. 2, numbering is started from the same polarization direction, and then is performed in another polarization direction, herein the same sign is adopted to represent the same antenna polarization direction, figures below the antennae represent numbers of the antennae, and the numbers of the 8 antennae are sequentially 0, 1, 2, 3, 4, 5, 6 and 7.

During large-scale antenna 3D MIMO standardization, a CSI-RS pattern enhancement direction is mainly 16 ports, and 3D MIMO of a larger channel number is implemented by beamformed CSI-RSs, so that an excessive CSI-RS overhead is avoided. Design of a CSI-RS pattern of 16 ports is being discussed by existing standardization. At present, a 16-channel antenna form which is mainly considered is 4H2V (4 horizontal polarized antennae and 2 channels in a perpendicular direction). Considering a codebook design, a specific numbering rule is as follows: as shown in FIG. 3, numbering is started from the same polarization direction, and then is performed in another polarization direction, herein the same sign is adopted to represent the same antenna polarization direction, figures below antennae represent numbers of the antennae, and the numbers of the 16 antennae are sequentially 0, 1, 2, 3, 4, 5, 6, 7, 8, 9, 10, 11, 12, 13, 14 and 15.

At present, a main CSI-RS pattern design direction is combination of existing CSI-RSs of 8 ports into CSI-RSs of 16 ports. Under this situation, when a base station sends CSI-RSs of 16 ports, there exists the problem of how to feed back accurate CSI by conventional UE (UE with 8 ports).

There are two solutions in the related technology, herein, in the first solution, the base station sends two sets of CSI-RSs, i.e., CSI-RSs of 16 ports+8 ports (or 2 and 4 ports). This solution has the shortcoming that the base station sends the two sets of CSI-RSs, so that a Resource Element (RE) overhead is increased.

In the second solution, the base station sends a set of CSI-RSs of 16 ports, notifies a CSI-RS pattern of 16 ports to new UE (UE with 16 ports) and notifies a CSI-RS pattern of 8 ports (or 2 and 4 ports) to conventional UE. Then, CSI-RSs read by the conventional UE are sent by antennae 0~7. However, an existing 8-antenna codebook is designed according to a dual-polarized antenna form. Therefore, this solution may not achieve relatively high compatibility with CSI measurement of the conventional UE.

SUMMARY

Embodiments of the disclosure are intended to provide a CSI-RS sending method and device, a base station and UE, which may reduce a repeated overhead of CSI-RSs, make CSI measurement of conventional UE more accurate and improve performance of a base station system.

In order to achieve the purpose, the embodiments of the disclosure provide a CSI-RS sending method, which may be applied to a base station, the method including that:

CSI-RSs are sent through 16 CSI-RS ports, herein the CSI-RSs may be mapped to an RE set in a CSI-RS pilot pattern, the RE set may include REs to which CSI-RSs of 2 groups of 8 ports are mapped, a first group of CSI-RS port serial numbers and second group of CSI-RS port serial numbers for the 16 CSI-RS ports may be mapped to REs to which CSI-RSs of the first group of 8 ports among the CSI-RSs of the two groups of 8 ports are mapped, and a third group of CSI-RS port serial numbers and fourth group of CSI-RS port serial numbers for the 16 CSI-RS ports may be mapped to REs to which CSI-RSs of the second group of 8 ports among the CSI-RSs of the two groups of 8 ports are mapped, herein each of the first group of CSI-RS port serial numbers, the second group of CSI-RS port serial numbers, the third group of CSI-RS port serial numbers and the fourth group of CSI-RS port serial numbers may include 4 continuous CSI-RS port serial numbers, the first group of CSI-RS port serial numbers and the second group of CSI-RS port serial numbers may be spaced by the third group of CSI-RS port serial numbers, and the third group of CSI-RS port serial numbers and the fourth group of CSI-RS port serial numbers may be spaced by the second group of CSI-RS port serial numbers; and CSI measured by UE on the basis of the CSI-RS is received.

Herein, the serial numbers of the 16 CSI-RS ports may sequentially be 15, 16, 17, 18, 19, 20, 21, 22, 23, 24, 25, 26, 27, 28, 29 and 30.

Herein, two continuous CSI-RS port serial numbers among the first group of CSI-RS port serial numbers may be mapped to two REs located on a first subcarrier, and the other two continuous CSI-RS port serial numbers among the first group of CSI-RS port serial numbers may be mapped to two REs located on a second subcarrier, herein the first subcarrier and the second subcarrier may be spaced by 5 subcarriers, and may be two subcarriers among 4 subcarriers where the mapped REs for the CSI-RSs of the first group of 8 ports are located.

Herein, two continuous CSI-RS port serial numbers among the second group of CSI-RS port serial numbers may be mapped to two REs located on a third subcarrier, and the other two continuous CSI-RS port serial numbers among the second group of CSI-RS port serial numbers may be mapped to two REs located on a fourth subcarrier, herein the third subcarrier and the fourth subcarrier may be spaced by 5 subcarriers, and may be the other two subcarriers among the 4 subcarriers where the mapped REs for the CSI-RSs of the first group of 8 ports are located.

Herein, two continuous CSI-RS port serial numbers among the third group of CSI-RS port serial numbers may be mapped to two REs located on a fifth subcarrier, and the other two continuous CSI-RS port serial numbers among the third group of CSI-RS port serial numbers may be mapped to two REs located on a sixth subcarrier, herein the fifth subcarrier and the sixth subcarrier may be spaced by 5 subcarriers, and may be two subcarriers among 4 subcarriers where the mapped REs for the CSI-RSs of the second group of 8 ports are located.

Herein, two continuous CSI-RS port serial numbers among the fourth group of CSI-RS port serial numbers may be mapped to two REs located on a seventh subcarrier, and the other two continuous CSI-RS port serial numbers among the fourth group of CSI-RS port serial numbers may be mapped to two REs located on an eighth subcarrier, herein the seventh subcarrier and the eighth subcarrier may be spaced by 5 subcarriers, and may be the other two subcarriers among the 4 subcarriers where the mapped REs for the CSI-RSs of the second group of 8 ports are located.

Herein, the first group of CSI-RS port serial numbers and the third group of CSI-RS port serial numbers may form 8 continuous CSI-RS port serial numbers corresponding to 8 antennae or 8 radio frequency channels in a first polarization direction; and the second group of CSI-RS port serial numbers and the fourth group of CSI-RS port serial numbers may form 8 continuous CSI-RS port serial numbers corresponding to 8 antennae or 8 radio frequency channels in a second polarization direction.

Herein, 4 antennae or 4 radio frequency channels which correspond to the first group of CSI-RS port serial numbers and of which a polarization direction is the first polarization direction and 4 antennae or 4 radio frequency channels which correspond to the second group of CSI-RS port serial numbers and of which a polarization direction is the second polarization direction may be at a first perpendicular location, and 4 antennae or 4 radio frequency channels which correspond to the third group of CSI-RS port serial numbers and of which a polarization direction is the first polarization direction and 4 antennae or 4 radio frequency channels which correspond to the fourth group of CSI-RS port serial numbers and of which a polarization direction is the second polarization direction may be at a second perpendicular location.

The embodiments of the disclosure further provide a CSI-RS sending device, which may be applied to a base station, the device including:

a first sending module, arranged to send CSI-RSs through 16 CSI-RS ports, herein the CSI-RSs may be mapped to an RE set in a CSI-RS pilot pattern, the RE set may include REs to which CSI-RSs of 2 groups of 8 ports are mapped, a first group of CSI-RS port serial numbers and second group of CSI-RS port serial numbers for the 16 CSI-RS ports may be mapped to REs to which CSI-RSs of the first group of 8 ports among the CSI-RSs of the two groups of 8 ports are mapped, and a third group of CSI-RS port serial numbers and fourth group of CSI-RS port serial numbers for the 16 CSI-RS ports may be mapped to REs to which CSI-RSs of the second group of 8 ports among the CSI-RSs of the two groups of 8 ports are mapped, herein each of the first group of CSI-RS port serial numbers, the second group of CSI-RS port serial numbers, the third group of CSI-RS port serial numbers and the fourth group of CSI-RS port serial numbers may include 4 continuous CSI-RS port serial numbers, the first group of CSI-RS port serial numbers and the second group of CSI-RS port serial numbers may be spaced by the third group of CSI-RS port serial numbers, and the third group of CSI-RS port serial numbers and the fourth group of CSI-RS port serial numbers may be spaced by the second group of CSI-RS port serial numbers; and a first receiving module, arranged to receive CSI measured by UE on the basis of the CSI-RS.

Herein, the serial numbers of the 16 CSI-RS ports may sequentially be 15, 16, 17, 18, 19, 20, 21, 22, 23, 24, 25, 26, 27, 28, 29 and 30.

Herein, two continuous CSI-RS port serial numbers among the first group of CSI-RS port serial numbers may be mapped to two REs located on a first subcarrier, and the other two continuous CSI-RS port serial numbers among the first group of CSI-RS port serial numbers may be mapped to two REs located on a second subcarrier, herein the first subcarrier and the second subcarrier may be spaced by 5 subcarriers, and may be two subcarriers among 4 subcarriers where the mapped REs for the CSI-RSs of the first group of 8 ports are located.

Herein, two continuous CSI-RS port serial numbers among the second group of CSI-RS port serial numbers may be mapped to two REs located on a third subcarrier, and the other two continuous CSI-RS port serial numbers among the second group of CSI-RS port serial numbers may be mapped to two REs located on a fourth subcarrier, herein the third subcarrier and the fourth subcarrier may be spaced by 5 subcarriers, and may be the other two subcarriers among the 4 subcarriers where the mapped REs for the CSI-RSs of the first group of 8 ports are located.

Herein, two continuous CSI-RS port serial numbers among the third group of CSI-RS port serial numbers may be mapped to two REs located on a fifth subcarrier, and the other two continuous CSI-RS port serial numbers among the third group of CSI-RS port serial numbers may be mapped to two REs located on a sixth subcarrier, herein the fifth subcarrier and the sixth subcarrier may be spaced by 5 subcarriers, and may be two subcarriers among 4 subcarriers where the mapped REs for the CSI-RSs of the second group of 8 ports are located.

Herein, two continuous CSI-RS port serial numbers among the fourth group of CSI-RS port serial numbers may be mapped to two REs located on a seventh subcarrier, and the other two continuous CSI-RS port serial numbers among the fourth group of CSI-RS port serial numbers may be mapped to two REs located on an eighth subcarrier, herein the seventh subcarrier and the eighth subcarrier may be spaced by 5 subcarriers, and may be the other two subcarriers among the 4 subcarriers where the mapped REs for the CSI-RSs of the second group of 8 ports are located.

Herein, the first group of CSI-RS port serial numbers and the third group of CSI-RS port serial numbers may form 8 continuous CSI-RS port serial numbers corresponding to 8 antennae or 8 radio frequency channels in a first polarization direction; and the second group of CSI-RS port serial numbers and the fourth group of CSI-RS port serial numbers may form 8 continuous CSI-RS port serial numbers corresponding to 8 antennae or 8 radio frequency channels in a second polarization direction.

Herein, 4 antennae or 4 radio frequency channels which correspond to the first group of CSI-RS port serial numbers and of which a polarization direction is the first polarization direction and 4 antennae or 4 radio frequency channels which correspond to the second group of CSI-RS port serial numbers and of which a polarization direction is the second polarization direction may be at a first perpendicular location, and 4 antennae or 4 radio frequency channels which correspond to the third group of CSI-RS port serial numbers and of which a polarization direction is the first polarization direction and 4 antennae or 4 radio frequency channels which correspond to the fourth group of CSI-RS port serial numbers and of which a polarization direction is the second polarization direction may be at a second perpendicular location.

The embodiments of the disclosure further provide a base station, which may include the abovementioned CSI-RS sending device.

The embodiments of the disclosure further provide a CSI-RS sending method, which may be applied to UE, the method including that:

CSI-RSs sent by a base station according to CSI-RS pattern information are received;

CSI is measured on the basis of the received CSI-RSs; and the measured CSI is sent to the base station.

The embodiments of the disclosure further provide a CSI-RS sending device, which may be applied to UE, the device including:

a second receiving module, arranged to receive CSI-RSs sent by a base station according to CSI-RS pattern information;

a measurement module, arranged to measure CSI on the basis of the received CSI-RSs; and a second sending module, arranged to send the measured CSI to the base station.

The embodiments of the disclosure further provide UE, which may include the abovementioned CSI-RS sending device.

The solutions of the disclosure at least achieve the following beneficial effects.

In the embodiments of the disclosure, the CSI-RSs sent through the 16 CSI-RS ports are mapped to the RE set in the CSI-RS pilot pattern, the RE set includes REs to which CSI-RSs of the two groups of 8 ports are mapped, the first group of CSI-RS port serial numbers and second group of CSI-RS port serial numbers for the 16 CSI-RS ports are mapped to REs to which CSI-RSs of the first group of 8 ports in the two groups of 8 ports are mapped, the third group of CSI-RS port serial numbers and the fourth group of CSI-RS port serial numbers are mapped to REs to which CSI-RSs of the second group of 8 ports in the two groups of 8 ports are mapped, each of the first group of CSI-RS port serial numbers, the second group of CSI-RS port serial numbers, the third group of CSI-RS port serial numbers and the fourth group of CSI-RS port serial numbers includes 4 continuous CSI-RS port serial numbers, the first group of CSI-RS port serial numbers and the second group of CSI-RS port serial numbers are spaced by the third group of CSI-RS port serial numbers, and the third group of CSI-RS port serial numbers and the fourth group of CSI-RS port serial numbers are spaced by the second group of CSI-RS port serial numbers, so that the problem of incapability of conventional UE in accurately performing CSI measurement when the base station sends CSI-RSs of 16 ports is solved, and effects of reducing a repeated overhead of the CSI-RSs, simultaneously making CSI measurement of the conventional UE more accurate and improving performance of a base station system are achieved.

BRIEF DESCRIPTION OF DRAWINGS

Figure 1:
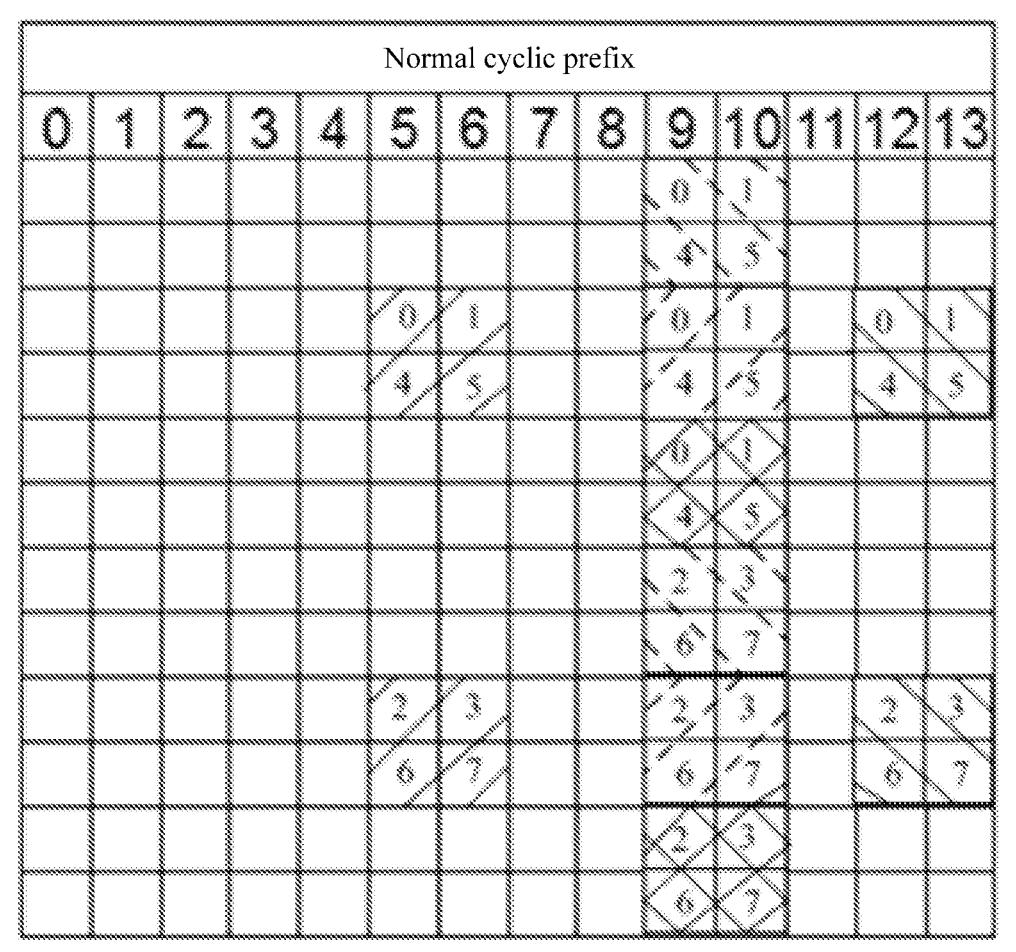

FIG. 1 is a schematic diagram of a CSI-RS pattern of 8 ports according to the related technology.

FIG. 6 is a first schematic diagram of a CSI-RS pilot pattern according to an embodiment of the disclosure.

FIG. 7 is a second schematic diagram of a CSI-RS pilot pattern according to an embodiment of the disclosure.

FIG. 8 is a third schematic diagram of a CSI-RS pilot pattern according to an embodiment of the disclosure.

FIG. 9 is a fourth schematic diagram of a CSI-RS pilot pattern according to an embodiment of the disclosure.

FIG. 10 is a diagram of a CSI-RS pattern of 8 ports in a time division duplexing system according to an embodiment of the disclosure.

FIG. 11 is a fifth schematic diagram of a CSI-RS pilot pattern according to an embodiment of the disclosure.

DETAILED DESCRIPTION

Figure 2:
FIG. 2 is an antenna numbering diagram of 8 antennae according to the related technology.

Exemplary embodiments of the disclosure will be described below with reference to the drawings in more detail. Although the exemplary embodiments of the disclosure are shown in the drawings, it should be understood that the disclosure may be implemented in various forms and should not be limited by the embodiments elaborated herein. On the contrary, these embodiments are provided to make the disclosure understood more thoroughly and completely deliver the scope of the disclosure to those skilled in the art.

Figure 4:
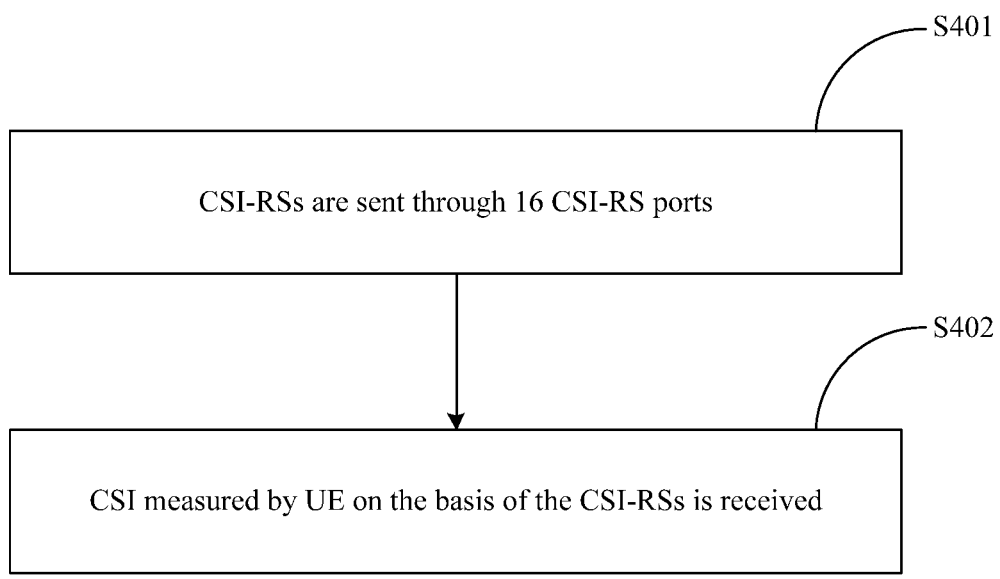
FIG. 4 is a flowchart of a CSI-RS sending method according to an embodiment of the disclosure.

As shown in FIG. 4, an embodiment of the disclosure provides a CSI-RS sending method, which is applied to a base station, herein the method includes the following steps.

In S401, CSI-RSs are sent through 16 CSI-RS ports.

In an embodiment of the disclosure, the base station may send the CSI-RSs of the 16 ports to UE.

In S402, CSI measured by UE on the basis of the CSI-RS is received.

In an embodiment of the disclosure, the CSI-RSs are mapped to one or more RE sets in a CSI-RS pilot pattern, herein each RE set includes REs to which CSI-RSs of 2 groups of 8 ports are mapped, a first group of CSI-RS port serial numbers and second group of CSI-RS port serial numbers for the 16 CSI-RS ports are mapped to REs to which CSI-RSs of the first group of 8 ports among the CSI-RSs of the two groups of 8 ports are mapped, and a third group of CSI-RS port serial numbers and fourth group of CSI-RS port serial numbers for the 16 CSI-RS ports are mapped to REs to which CSI-RSs of the second group of 8 ports among the CSI-RSs of the two groups of 8 ports are mapped, herein each of the first group of CSI-RS port serial numbers, the second group of CSI-RS port serial numbers, the third group of CSI-RS port serial numbers and the fourth group of CSI-RS port serial numbers includes 4 continuous CSI-RS port serial numbers, the first group of CSI-RS port serial numbers and the second group of CSI-RS port serial numbers are spaced by the third group of CSI-RS port serial numbers, and the third group of CSI-RS port serial numbers and the fourth group of CSI-RS port serial numbers are spaced by the second group of CSI-RS port serial numbers.

Figure 3:
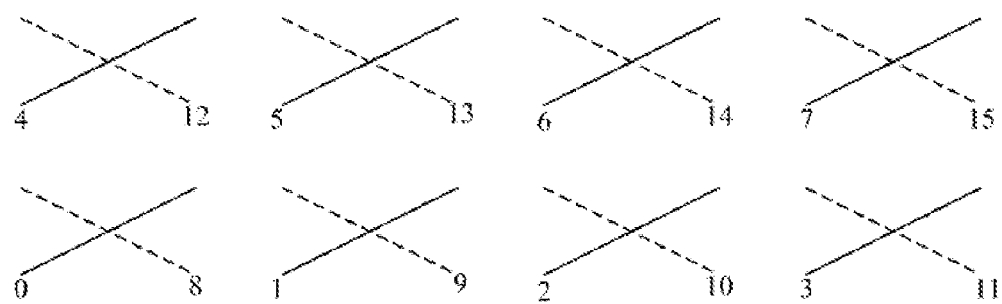
FIG. 3 is an antenna numbering diagram of 16 antennae according to the related technology.
Figure 5:
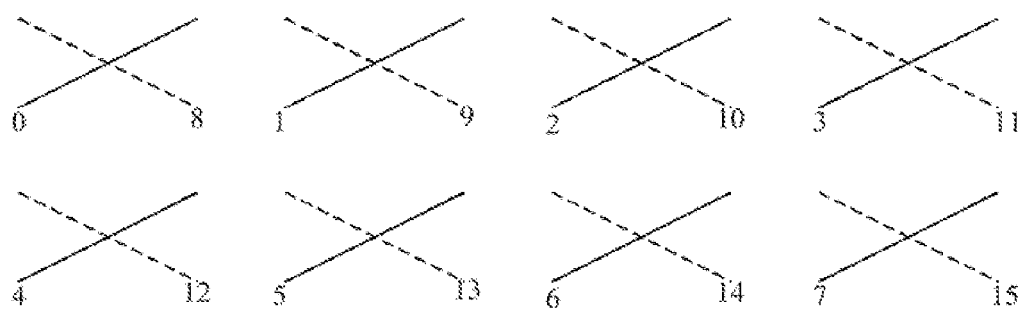
FIG. 5 is an antenna numbering diagram of 16 antennae according to an embodiment of the disclosure.

It is important to note that, in an embodiment of the disclosure, an arrangement and numbering manner of 16 antennae corresponding to the 16 CSI-RS ports may be shown in FIG. 3 and may also be shown in FIG. 5. Of course, a numbering rule of the 16 antennae in FIG. 5 is as follows: numbering is started from the same polarization direction, and then is performed in another polarization direction, herein the same sign (for example, "/") is adopted to represent the same antenna polarization direction, figures below the antennae are numbers of the antennae, and the number of each antenna corresponds to a CSI-RS port serial number. Therefore, when the numbers of the 16 antennae in FIG. 5 are 0, 1, 2, 3, 4, 5, 6, 7, 8, 9, 10, 11, 12, 13, 14 and 15 respectively, the 16 corresponding CSI-RS port serial numbers are 0, 1, 2, 3, 4, 5, 6, 7, 8, 9, 10, 11, 12, 13, 14 and 15 respectively. It is important to note that, in an embodiment of the disclosure, specific figures of the numbers of the antennae and the CSI-RS port serial numbers are not limited. Specifically, the 16 CSI-RS port serial numbers may sequentially be X+0, X+1, X+2, X+3, X+4, X+5, X+6, X+7, X+8, X+9, X+10, X+11, X+12, X+13, X+14 and X+15, herein X is a natural number. Typically, X is 15, that is, the 16 CSI-RS port serial numbers are sequentially 15, 16, 17, 18, 19, 20, 21, 22, 23, 24, 25, 26, 27, 28, 29 and 30.

It is important to note that the first group of CSI-RS port serial numbers and the third group of CSI-RS port serial numbers form 8 continuous CSI-RS port serial numbers corresponding to 8 antennae (for example, 8 antennae numbered to be 0, 1, 2, 3, 4, 5, 6 and 7 in FIG. 5) or radio frequency channels in a first polarization direction; and the second group of CSI-RS port serial numbers and the fourth group of CSI-RS port serial numbers form 8 continuous CSI-RS port serial numbers corresponding to 8 antennae (for example, 8 antennae numbered to be 8, 9, 10, 11, 12, 13, 14 and 15 in FIG. 5) or radio frequency channels in a second polarization direction. Furthermore, 4 antennae (for example, the 4 antennae numbered to be 0, 1, 2 and 3 in FIG. 5) or radio frequency channels which correspond to the first group of CSI-RS port serial numbers and of which a polarization direction is the first polarization direction and 4 antennae (for example, the 4 antennae numbered to be 8, 9, 10 and 11 in FIG. 5) or radio frequency channels which correspond to the second group of CSI-RS port serial numbers and of which a polarization direction is the second polarization direction are at a first perpendicular location, and 4 antennae (for example, the 4 antennae numbered to be 4, 5, 6 and 7 in FIG. 5) or radio frequency channels which correspond to the third group of CSI-RS port serial numbers and of which a polarization direction is the first polarization direction and 4 antennae (for example, the 4 antennae numbered to be 12, 13, 14 and 15 in FIG. 5) or radio frequency channels which correspond to the fourth group of CSI-RS port serial numbers and of which a polarization direction is the second polarization direction are at a second perpendicular location.

In an embodiment of the disclosure, two continuous CSI-RS port serial numbers (CSI-RS port serial numbers corresponding to the antennae numbered to be 0 and 1 in FIG. 5) in the first group of CSI-RS port serial numbers (CSI-RS port serial numbers corresponding to the antennae numbered to be 0, 1, 2 and 3 in FIG. 5) are mapped to two REs located on a first subcarrier, and the other two continuous CSI-RS port serial numbers (CSI-RS port serial numbers corresponding to the antennae numbered to be 2 and 3 in FIG. 5) in the first group of CSI-RS port serial numbers are mapped to two REs located on a second subcarrier, herein the first subcarrier and the second subcarrier are two subcarriers among 4 subcarriers where the mapped REs for the CSI-RSs of the first group of 8 ports are located. Furthermore, two continuous CSI-RS port serial numbers (CSI-RS port serial numbers corresponding to the antennae numbered to be 8 and 9 in FIG. 5) in the second group of CSI-RS port serial numbers (CSI-RS port serial numbers corresponding to the antennae numbered to be 8, 9, 10 and 11 in FIG. 5) are mapped to two REs located on a third subcarrier, and the other two continuous CSI-RS port serial numbers (CSI-RS port serial numbers corresponding to the antennae numbered to be 10 and 11 in FIG. 5) in the second group of CSI-RS port serial numbers are mapped to two REs located on a fourth subcarrier, herein the third subcarrier and the fourth subcarrier are the other two subcarriers among the 4 subcarriers where the mapped REs for the CSI-RSs of the first group of 8 ports are located.

Similarly, two continuous CSI-RS port serial numbers (CSI-RS port serial numbers corresponding to the antennae numbered to be 4 and 5 in FIG. 5) in the third group of CSI-RS port serial numbers (CSI-RS port serial numbers corresponding to the antennae numbered to be 4, 5, 6 and 7 in FIG. 5) are mapped to two REs located on a fifth subcarrier, and the other two continuous CSI-RS port serial numbers (CSI-RS port serial numbers corresponding to the antennae numbered to be 6 and 7 in FIG. 5) in the third group of CSI-RS port serial numbers are mapped to two REs located on a sixth subcarrier, herein the fifth subcarrier and the sixth subcarrier are two subcarriers among 4 subcarriers where the mapped REs for the CSI-RSs of the second group of 8 ports are located. Furthermore, two continuous CSI-RS port serial numbers (CSI-RS port serial numbers corresponding to the antennae numbered to be 12 and 13 in FIG. 5) in the fourth group of CSI-RS port serial numbers (CSI-RS port serial numbers corresponding to the antennae numbered to be 12, 13, 14 and 15 in FIG. 5) are mapped to two REs located on a seventh subcarrier, and the other two continuous CSI-RS port serial numbers (CSI-RS port serial numbers corresponding to the antennae numbered to be 14 and 15 in FIG. 5) in the fourth group of CSI-RS port serial numbers are mapped to two REs located on an eighth subcarrier, herein the seventh subcarrier and the eighth subcarrier are the other two subcarriers among the 4 subcarriers where the mapped REs for the CSI-RSs of the second group of 8 ports are located.

In an embodiment of the disclosure, there are multiple CSI-RS pilot patterns, herein, when X is 0, for an FDD system, any two patterns (i.e., a CSI-RS pattern of the first group of 8 ports and a CSI-RS pattern of the second group of 8 ports respectively) may be selected from CSI-RS patterns of 8 ports shown in FIG. 1 to be combined into a CSI-RS pattern of 16 ports. It is important to note that mapping locations of the 16 CSI-RS port serial numbers are required to be changed after combination. Specifically, numbers 0~7 in the CSI-RS pattern of the first group of 8 ports may be changed into 0~3 and 8~11 (or 4~7 and 12~15), and numbers 0~7 in the CSI-RS pattern of the second group of 8 ports may be sequentially changed into 4~7 and 12~15 (or 0~3 and 8~11). Since there exist 5 CSI-RS patterns in FIG. 1, there should correspondingly exist 10 (i.e., C(5, 2)) CSI-RS pilot patterns (as shown in FIG. 6~FIG. 9, any two patterns are selected from the CSI-RS patterns of the 8 ports shown in FIG. 1 to form 4 CSI-RS pilot patterns of the CSI-RSs of the 16 ports) in the FDD system, and there may exist mapping locations of two groups of 16 ports in each CSI-RS pilot pattern. Under this situation, when the base station sends the CSI-RSs, the CSI-RSs may be mapped to at least one group of 16 ports (i.e., the RE set) in the CSI-RS pilot pattern. It is important to note that, for conveniently and clearly representing the CSI-RS pattern of the 16 ports, a set of cells with the same mark (for example, "\" and "/") in each figure represents mapping locations of a group of 16 ports, and a group of 8 ports (numbered to be 0, 1, 2, 3, 4, 5, 6 and 7 respectively and corresponding to the CSI-RS port serial numbers 0~7) without any mark in the figure are mainly intended to make it convenient for the base station to send the CSI-RSs of the 8 ports under a certain circumstance. It is important to note that figures 0~15 in FIG. 6~FIG. 9 sequentially correspond to the 16 CSI-RS port serial numbers 0~15.

Figure 10:
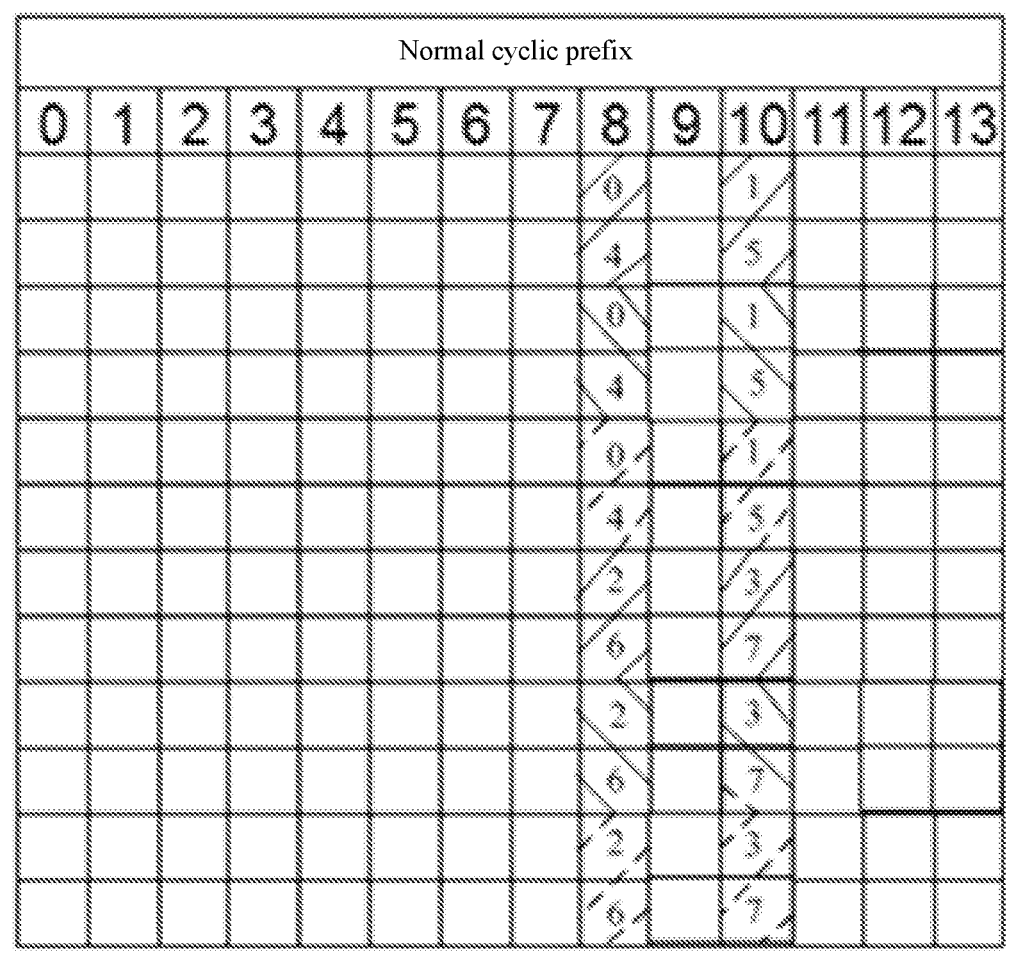

A time division duplexing system further has three CSI-RS patterns of 8 ports shown in FIG. 10, besides the 5 CSI-RS patterns of 8 ports shown in FIG. 1. Therefore, besides the 10 CSI-RS pilot patterns, there also exist other 3 CSI-RS pilot patterns, and their specific configuration manners are consistent with the configuration manner in the FDD system, and thus will not be elaborated herein. It is important to note that a set of cells with the same mark (for example, "\" and "/") in FIG. 10 represents a CSI-RS pattern of 8 ports (numbered to be 0, 1, 2, 3, 4, 5, 6 and 7 respectively and corresponding to the CSI-RS port serial numbers 0~7).

In an embodiment of the disclosure, the base station stores the CSI-RS pilot pattern (one of the multiple CSI-RS pilot patterns). For UE, it is necessary to distinguish new UE and conventional UE. The new UE may also store a CSI-RS pilot pattern consistent with the base station, and the conventional UE may consider the CSI-RS port serial numbers 0~3 and 8~11 (or 4~7 and 12~25) as CSI-RS port serial numbers 0~7, herein the new UE refers to UE with 16 ports, and the conventional UE refers to UE with 1, 2, 4 or 8 ports.

Figure 6:
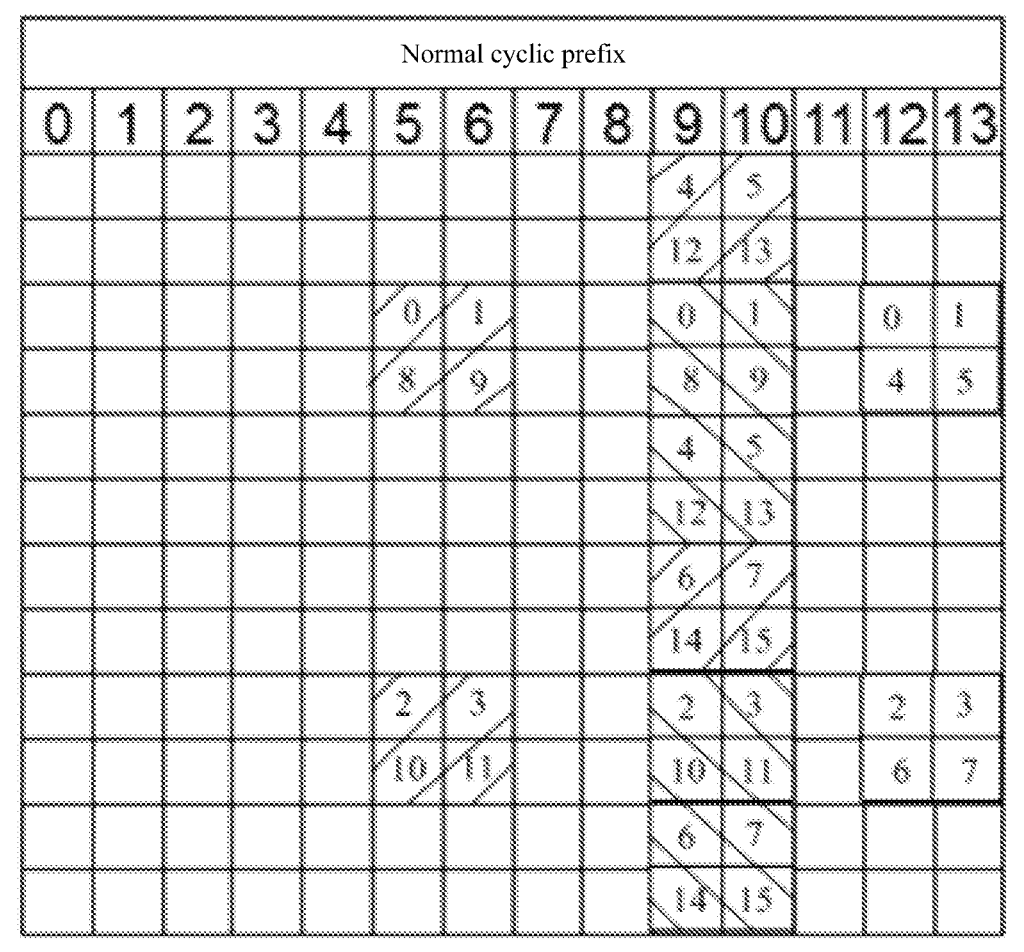
Figure 7:
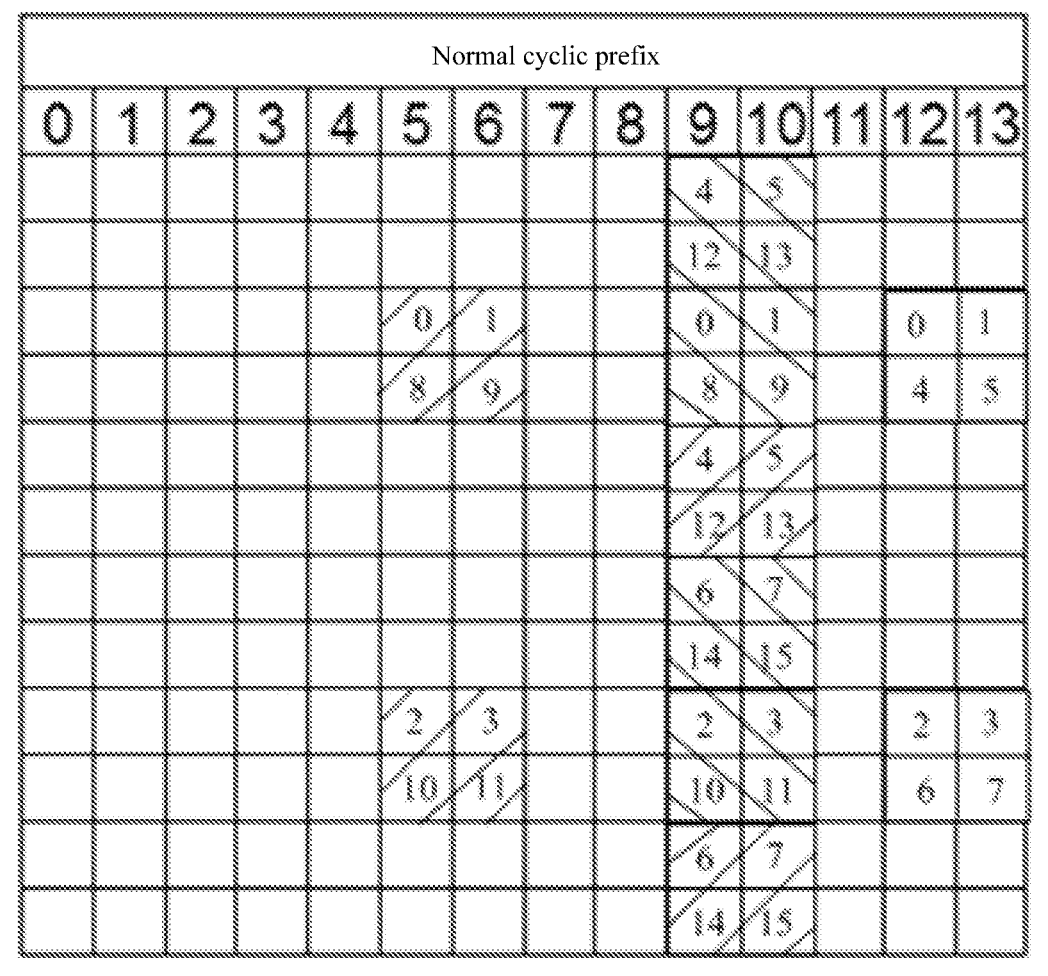
Figure 8:
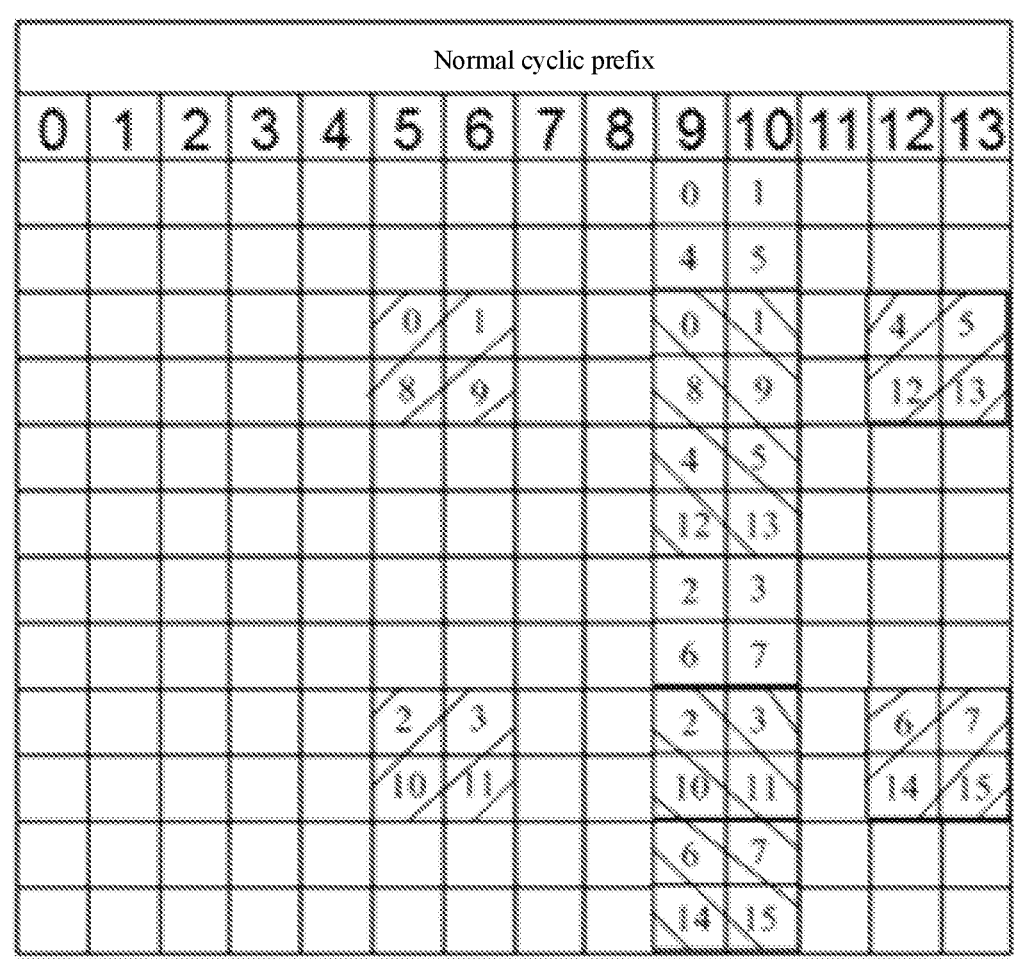
Figure 9:
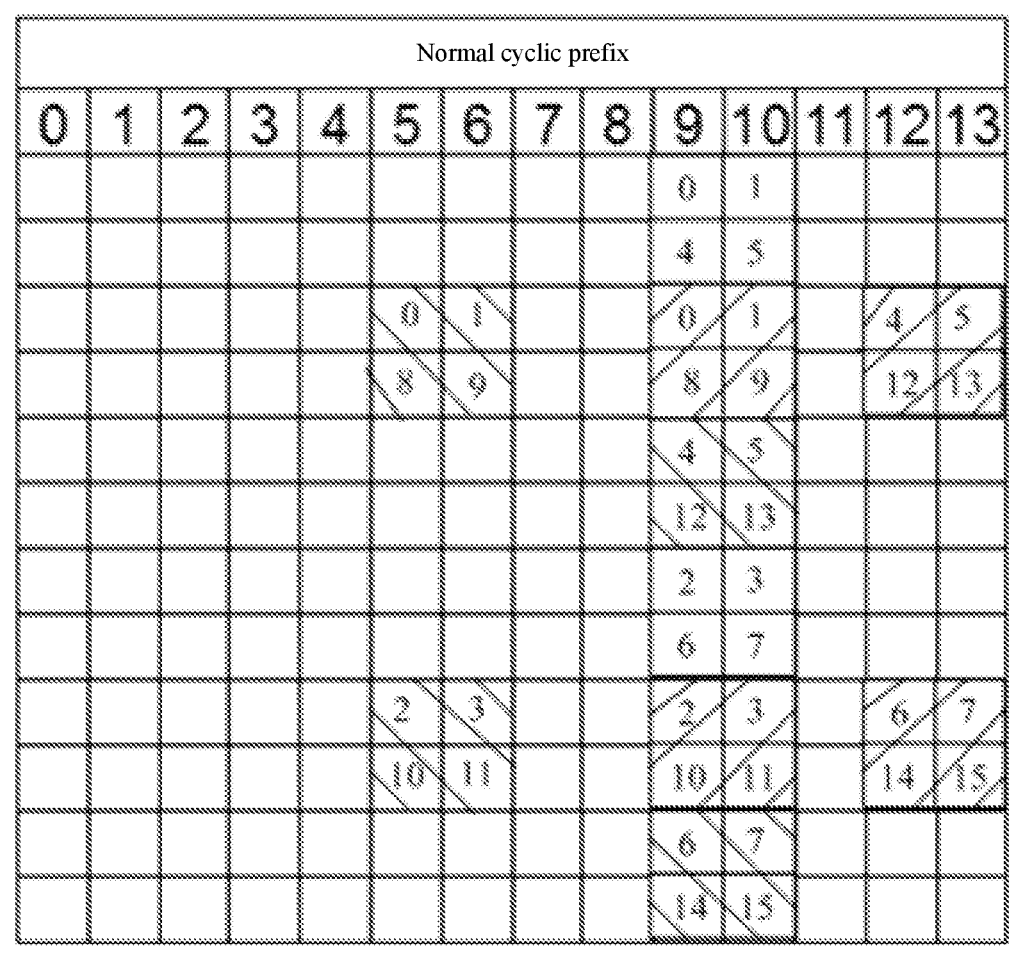
Figure 11:
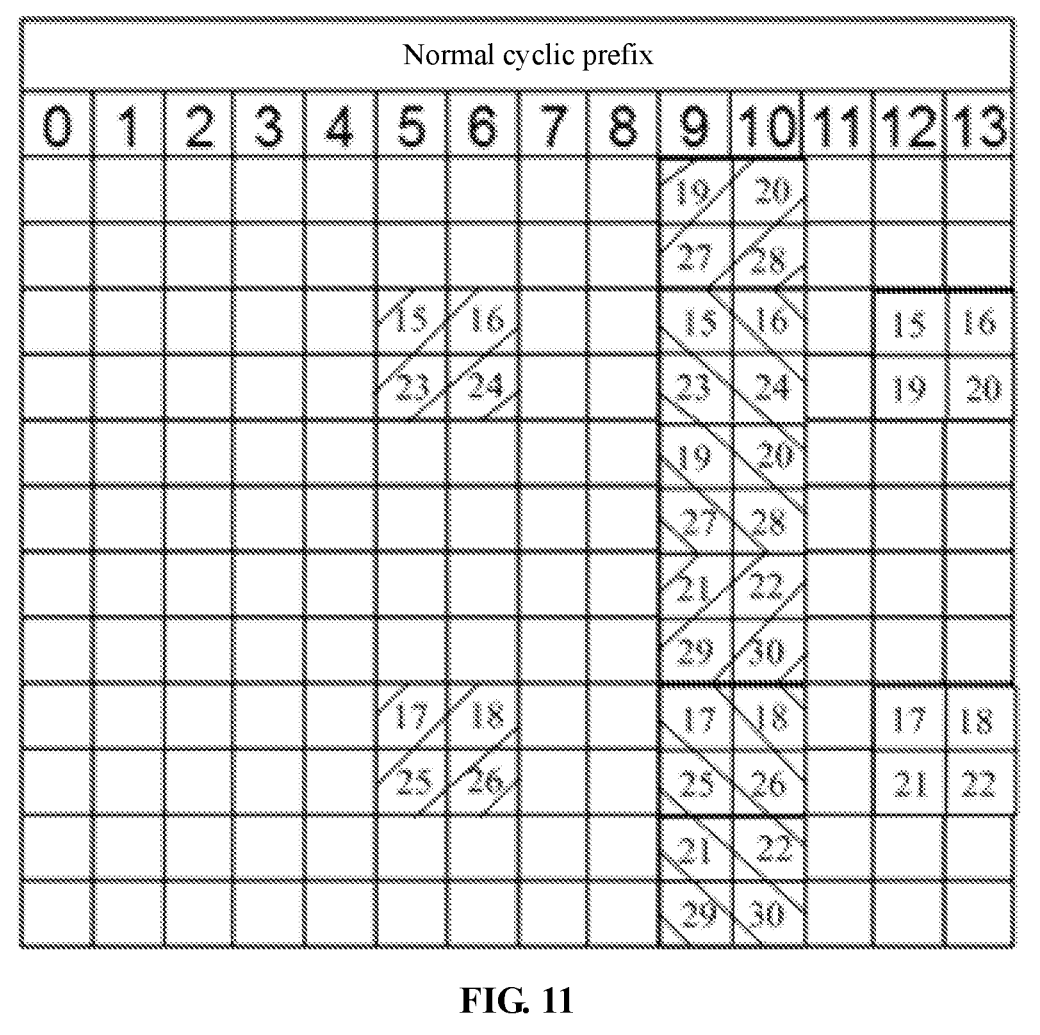

It is important to further note that, in an embodiment of the disclosure, when X is 15, the CSI-RS port serial numbers 0~15 in the CSI-RS pilot pattern shown in FIG. 6 may be changed into 15~30 shown in FIG. 11, and the CSI-RS port serial numbers 0~7 corresponding to the group of 8 ports without any mark in the figure may be changed into 15~22. Of course, the CSI-RS port serial numbers 0~15 in the CSI-RS pilot patterns shown in FIG. 7~FIG. 9 may also be changed into 15~30, of which a principle is similar to FIG. 6 and thus will not be elaborated herein.

In an embodiment of the disclosure, the CSI-RSs sent through the 16 CSI-RS ports are mapped to the RE set in the CSI-RS pilot pattern, the RE set includes REs to which CSI-RSs of the two groups of 8 ports are mapped, the first group of CSI-RS port serial numbers and second group of CSI-RS port serial numbers for the 16 CSI-RS ports are mapped to REs to which CSI-RSs of the first group of 8 ports in the two groups of 8 ports are mapped, the third group of CSI-RS port serial numbers and the fourth group of CSI-RS port serial numbers are mapped to REs to which CSI-RSs of the second group of 8 ports in the two groups of 8 ports are mapped, each of the first group of CSI-RS port serial numbers, the second group of CSI-RS port serial numbers, the third group of CSI-RS port serial numbers and the fourth group of CSI-RS port serial numbers includes 4 continuous CSI-RS port serial numbers, the first group of CSI-RS port serial numbers and the second group of CSI-RS port serial numbers are spaced by the third group of CSI-RS port serial numbers, and the third group of CSI-RS port serial numbers and the fourth group of CSI-RS port serial numbers are spaced by the second group of CSI-RS port serial numbers, so that the problem of incapability of conventional UE in accurately performing CSI measurement when the base station sends CSI-RSs of 16 ports is solved, and effects of reducing a repeated overhead of the CSI-RSs, simultaneously making CSI measurement of the conventional UE more accurate and improving performance of a base station system are achieved.

Figure 12:
FIG. 12 is a structure diagram of a CSI-RS sending device according to an embodiment of the disclosure.

As shown in FIG. 12, some embodiments of the disclosure provide a CSI-RS sending device, which is applied to a base station. The device includes:

a first sending module 1201, arranged to send CSI-RSs through 16 CSI-RS ports, herein the CSI-RSs are mapped to an RE set in a CSI-RS pilot pattern, the RE set includes REs to which CSI-RSs of 2 groups of 8 ports are mapped, a first group of CSI-RS port serial numbers and second group of CSI-RS port serial numbers for the 16 CSI-RS ports are mapped to REs to which CSI-RSs of the first group of 8 ports among the CSI-RSs of the two groups of 8 ports are mapped, and a third group of CSI-RS port serial numbers and fourth group of CSI-RS port serial numbers for the 16 CSI-RS ports are mapped to REs to which CSI-RSs of the second group of 8 ports among the CSI-RSs of the two groups of 8 ports are mapped, herein each of the first group of CSI-RS port serial numbers, the second group of CSI-RS port serial numbers, the third group of CSI-RS port serial numbers and the fourth group of CSI-RS port serial numbers includes 4 continuous CSI-RS port serial numbers, the first group of CSI-RS port serial numbers and the second group of CSI-RS port serial numbers are spaced by the third group of CSI-RS port serial numbers, and the third group of CSI-RS port serial numbers and the fourth group of CSI-RS port serial numbers are spaced by the second group of CSI-RS port serial numbers; and a first receiving module 1202, arranged to receive CSI measured by UE on the basis of the CSI-RS.

Herein, the serial numbers of the 16 CSI-RS ports are sequentially 15, 16, 17, 18, 19, 20, 21, 22, 23, 24, 25, 26, 27, 28, 29 and 30.

Herein, two continuous CSI-RS port serial numbers among the first group of CSI-RS port serial numbers are mapped to two REs located on a first subcarrier, and the other two continuous CSI-RS port serial numbers among the first group of CSI-RS port serial numbers are mapped to two REs located on a second subcarrier, herein the first subcarrier and the second subcarrier are spaced by 5 subcarriers, and are two subcarriers among 4 subcarriers where the mapped REs for the CSI-RSs of the first group of 8 ports are located.

Herein, two continuous CSI-RS port serial numbers among the second group of CSI-RS port serial numbers are mapped to two REs located on a third subcarrier, and the other two continuous CSI-RS port serial numbers among the second group of CSI-RS port serial numbers are mapped to two REs located on a fourth subcarrier, herein the third subcarrier and the fourth subcarrier are spaced by 5 subcarriers, and are the other two subcarriers among the 4 subcarriers where the mapped REs for the CSI-RSs of the first group of 8 ports are located.

Herein, two continuous CSI-RS port serial numbers among the third group of CSI-RS port serial numbers are mapped to two REs located on a fifth subcarrier, and the other two continuous CSI-RS port serial numbers among the third group of CSI-RS port serial numbers are mapped to two REs located on a sixth subcarrier, herein the fifth subcarrier and the sixth subcarrier are spaced by 5 subcarriers, and are two subcarriers among 4 subcarriers where the mapped REs for the CSI-RSs of the second group of 8 ports are located.

Herein, two continuous CSI-RS port serial numbers among the fourth group of CSI-RS port serial numbers are mapped to two REs located on a seventh subcarrier, and the other two continuous CSI-RS port serial numbers among the fourth group of CSI-RS port serial numbers are mapped to two REs located on an eighth subcarrier, herein the seventh subcarrier and the eighth subcarrier are spaced by 5 subcarriers, and are the other two subcarriers among the 4 subcarriers where the mapped REs for the CSI-RSs of the second group of 8 ports are located.

Herein, the first group of CSI-RS port serial numbers and the third group of CSI-RS port serial numbers form 8 continuous CSI-RS port serial numbers corresponding to 8 antennae or 8 radio frequency channels in a first polarization direction; and the second group of CSI-RS port serial numbers and the fourth group of CSI-RS port serial numbers form 8 continuous CSI-RS port serial numbers corresponding to 8 antennae or 8 radio frequency channels in a second polarization direction.

Herein, 4 antennae or 4 radio frequency channels which correspond to the first group of CSI-RS port serial numbers and of which a polarization direction is the first polarization direction and 4 antennae or 4 radio frequency channels which correspond to the second group of CSI-RS port serial numbers and of which a polarization direction is the second polarization direction are at a first perpendicular location, and 4 antennae or 4 radio frequency channels which correspond to the third group of CSI-RS port serial numbers and of which a polarization direction is the first polarization direction and 4 antennae or 4 radio frequency channels which correspond to the fourth group of CSI-RS port serial numbers and of which a polarization direction is the second polarization direction are at a second perpendicular location.

In some embodiments of the disclosure, the base station maps the CSI-RSs sent through the 16 CSI-RS ports into the RE set in the CSI-RS pilot pattern, the RE set includes the REs to which CSI-RSs of the two groups of 8 ports are mapped, the first group of CSI-RS port serial numbers and second group of CSI-RS port serial numbers for the 16 CSI-RS ports are mapped to REs to which CSI-RSs of the first group of 8 ports in the two groups of 8 ports are mapped, the third group of CSI-RS port serial numbers and the fourth group of CSI-RS port serial numbers are mapped to REs to which CSI-RSs of the second group of 8 ports in the two groups of 8 ports are mapped, each of the first group of CSI-RS port serial numbers, the second group of CSI-RS port serial numbers, the third group of CSI-RS port serial numbers and the fourth group of CSI-RS port serial numbers includes 4 continuous CSI-RS port serial numbers, the first group of CSI-RS port serial numbers and the second group of CSI-RS port serial numbers are spaced by the third group of CSI-RS port serial numbers, and the third group of CSI-RS port serial numbers and the fourth group of CSI-RS port serial numbers are spaced by the second group of CSI-RS port serial numbers, so that the problem of incapability of conventional UE in accurately performing CSI measurement when the base station sends CSI-RSs of 16 ports is solved, and effects of reducing a repeated overhead of the CSI-RSs, simultaneously making CSI measurement of the conventional UE more accurate and improving performance of a base station system are achieved.

It is important to note that the CSI-RS sending device provided by some embodiments of the disclosure is a device applied to the CSI-RS sending method, that is, all the embodiments of the method are applied to the device, and the same or similar beneficial effects may be achieved.

Some embodiments of the disclosure provide a base station, which includes the abovementioned CSI-RS sending device.

It is important to note that the base station provided by some embodiments of the disclosure is a base station including the abovementioned CSI-RS sending device, that is, all the embodiments of the CSI-RS sending device are applied to the base station, and the same or similar beneficial effects may be achieved.

Figure 13:
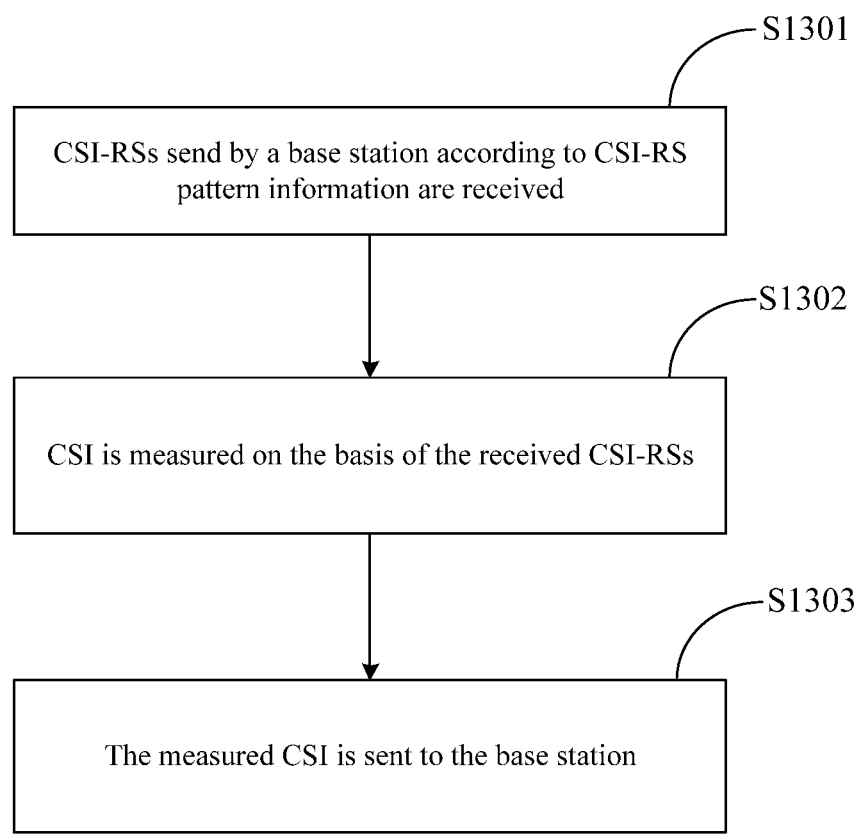
FIG. 13 is a flowchart of a CSI-RS sending method according to at least some embodiments of the disclosure.

As shown in FIG. 13, some embodiments of the disclosure provide a CSI-RS sending method, which is applied to UE, the method including the following steps.

In S1301, CSI-RSs sent by a base station according to CSI-RS pattern information are received.

In some embodiments of the disclosure, before S1301 is executed, the base station may notify the UE to receive the CSI-RSs sent by specific CSI-RS ports through the CSI-RS pattern information to enable the UE to accurately measure CSI, herein the operation that the base station notifies the UE to receive the CSI-RSs sent by the specific CSI-RS ports through the CSI-RS pattern information may be implemented by a conventional art, and thus will not be elaborated herein.

In 1302, CSI is measured on the basis of the received CSI-RSs.

In 1303, the measured CSI is sent to the base station.

In some embodiments of the disclosure, S1302 and S1303 may be implemented by adopting the conventional art, and thus will not be elaborated herein.

In some embodiments of the disclosure, the UE (new UE or conventional UE) may receive the CSI-RSs sent by the base station according to the CSI-RS pattern information according to the CSI-RS pattern information received by itself, may measure the CSI on the basis of the received CSI-RSs, and finally sends the measured CSI to the base station, so that the problem of incapability of conventional UE in accurately performing CSI measurement when the base station sends CSI-RSs of 16 ports is solved, and effects of reducing a repeated overhead of the CSI-RSs, simultaneously making CSI measurement of the conventional UE more accurate and improving performance of a base station system are achieved.

Figure 14:
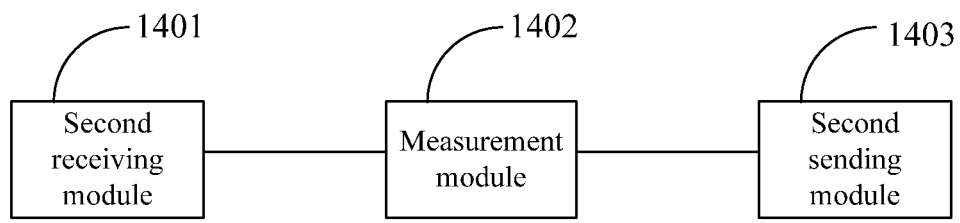
FIG. 14 is a structure diagram of a CSI-RS sending device according to at least some embodiments of the disclosure.

As shown in FIG. 14, some embodiments of the disclosure provide a CSI-RS sending device, which is applied to UE, the device including:

a second receiving module 1401, arranged to receive CSI-RSs sent by a base station according to CSI-RS pattern information;

a measurement module 1402, arranged to measure CSI on the basis of the received CSI-RSs; and a second sending module 1403, arranged to send the measured CSI to the base station.

In some embodiments of the disclosure, the UE (new UE or conventional UE) may receive the CSI-RSs sent by the base station according to the CSI-RS pattern information according to the CSI-RS pattern information received by itself, may measure the CSI on the basis of the received CSI-RSs, and finally sends the measured CSI to the base station, so that the problem of incapability of conventional UE in accurately performing CSI measurement when the base station sends CSI-RSs of 16 ports is solved, and effects of reducing a repeated overhead of the CSI-RSs, simultaneously making CSI measurement of the conventional UE more accurate and improving performance of a base station system are achieved.

It is important to note that the CSI-RS sending device provided by some embodiments of the disclosure is a device applied by the CSI-RS sending method, that is, all the embodiments of the method are applied to the device, and the same or similar beneficial effects may be achieved.

Some embodiments of the disclosure provide UE, which includes the abovementioned CSI-RS sending device.

It is important to note that the UE provided by some embodiments of the disclosure is UE including the abovementioned CSI-RS sending device, that is, all the embodiments of the CSI-RS sending device are applied to the UE, and the same or similar beneficial effects may be achieved.

The above is the preferred implementation mode of the disclosure. It should be pointed out that those of ordinary skilled in the art may further make a plurality of improvements and embellishments without departing from the principle of the disclosure and these improvements and embellishments shall also fall within the scope of protection of the disclosure.

The invention claimed is:

1. A Channel State Information-Reference Signal (CSI-RS) sending method, applied to a base station, the method comprising:

sending CSI-RSs through 16 CSI-RS ports, herein the CSI-RSs are mapped to a Resource Element (RE) set in a CSI-RS pilot pattern, the RE set comprising REs to which CSI-RSs of 2 groups of 8 ports are mapped, a first group of CSI-RS port serial numbers and second group of CSI-RS port serial numbers for the 16 CSI-RS ports are mapped to REs to which CSI-RSs of the first group of 8 ports among the CSI-RSs of the two groups of 8 ports are mapped, and a third group of CSI-RS port serial numbers and fourth group of CSI-RS port serial numbers for the 16 CSI-RS ports are mapped to REs to which CSI-RSs of the second group of 8 ports among the CSI-RSs of the two groups of 8 ports are mapped, herein each of the first group of CSI-RS port serial numbers, the second group of CSI-RS port serial numbers, the third group of CSI-RS port serial numbers and the fourth group of CSI-RS port serial numbers comprises 4 continuous CSI-RS port serial numbers, the first group of CSI-RS port serial numbers and the second group of CSI-RS port serial numbers are spaced by the third group of CSI-RS port serial numbers, and the third group of CSI-RS port serial numbers and the fourth group of CSI-RS port serial numbers are spaced by the second group of CSI-RS port serial numbers; and receiving Channel State Information (CSI) measured by User Equipment (UE) on the basis of the CSI-RSs.

2. The method according to claim 1, wherein serial numbers of the 16 CSI-RS ports are sequentially 15, 16, 17, 18, 19, 20, 21, 22, 23, 24, 25, 26, 27, 28, 29 and 30.

3. The method according to claim 1, wherein two continuous CSI-RS port serial numbers among the first group of CSI-RS port serial numbers are mapped to two REs located on a first subcarrier, and the other two continuous CSI-RS port serial numbers among the first group of CSI-RS port serial numbers are mapped to two REs located on a second subcarrier, wherein the first subcarrier and the second subcarrier are spaced by 5 subcarriers, and are two subcarriers among 4 subcarriers where the mapped REs for the CSI-RSs of the first group of 8 ports are located.

4. The method according to claim 3, wherein two continuous CSI-RS port serial numbers among the second group of CSI-RS port serial numbers are mapped to two REs located on a third subcarrier, and the other two continuous CSI-RS port serial numbers among the second group of CSI-RS port serial numbers are mapped to two REs located on a fourth subcarrier, wherein the third subcarrier and the fourth subcarrier are spaced by 5 subcarriers, and are the other two subcarriers among the 4 subcarriers where the mapped REs for the CSI-RSs of the first group of 8 ports are located.

5. The method according to claim 1, wherein two continuous CSI-RS port serial numbers among the third group of CSI-RS port serial numbers are mapped to two REs located on a fifth subcarrier, and the other two continuous CSI-RS port serial numbers among the third group of CSI-RS port serial numbers are mapped to two REs located on a sixth subcarrier, wherein the fifth subcarrier and the sixth subcarrier are spaced by 5 subcarriers, and are two subcarriers among 4 subcarriers where the mapped REs for the CSI-RSs of the second group of 8 ports are located.

6. The method according to claim 5, wherein two continuous CSI-RS port serial numbers among the fourth group of CSI-RS port serial numbers are mapped to two REs located on a seventh subcarrier, and the other two continuous CSI-RS port serial numbers among the fourth group of CSI-RS port serial numbers are mapped to two REs located on an eighth subcarrier, wherein the seventh subcarrier and the eighth subcarrier are spaced by 5 subcarriers, and are the other two subcarriers among the 4 subcarriers where the mapped REs for the CSI-RSs of the second group of 8 ports are located.

7. The method according to claim 1, wherein the first group of CSI-RS port serial numbers and the third group of CSI-RS port serial numbers form 8 continuous CSI-RS port serial numbers corresponding to 8 antennae or 8 radio frequency channels in a first polarization direction; and the second group of CSI-RS port serial numbers and the fourth group of CSI-RS port serial numbers form 8 continuous CSI-RS port serial numbers corresponding to 8 antennae or 8 radio frequency channels in a second polarization direction.

8. The method according to claim 7, wherein 4 antennae or 4 radio frequency channels which correspond to the first group of CSI-RS port serial numbers and of which a polarization direction is the first polarization direction and 4 antennae or 4 radio frequency channels which correspond to the second group of CSI-RS port serial numbers and of which a polarization direction is the second polarization direction are at a first perpendicular location, and 4 antennae or 4 radio frequency channels which correspond to the third group of CSI-RS port serial numbers and of which a polarization direction is the first polarization direction and 4 antennae or 4 radio frequency channels which correspond to the fourth group of CSI-RS port serial numbers and of which a polarization direction is the second polarization direction are at a second perpendicular location.

9. A Channel State Information-Reference Signal (CSI-RS) sending device, applied to a base station, wherein the device comprises:
  a processor; and
  a memory for storing instructions executable by the processor,
  wherein the processor is arranged to:
    send CSI-RSs through 16 CSI-RS ports, wherein the CSI-RSs are mapped to a Resource Element (RE) set in a CSI-RS pilot pattern, the RE set comprises REs to which CSI-RSs of 2 groups of 8 ports are mapped, a first group of CSI-RS port serial numbers and second group of CSI-RS port serial numbers for the 16 CSI-RS ports are mapped to REs to which CSI-RSs of the first group of 8 ports among the CSI-RSs of the two groups of 8 ports are mapped, and a third group of CSI-RS port serial numbers and fourth group of CSI-RS port serial numbers for the 16 CSI-RS ports are mapped to REs to which CSI-RSs of the second group of 8 ports among the CSI-RSs of the two groups of 8 ports are mapped,
    wherein each of the first group of CSI-RS port serial numbers, the second group of CSI-RS port serial numbers, the third group of CSI-RS port serial numbers and the fourth group of CSI-RS port serial numbers comprises 4 continuous CSI-RS port serial numbers, the first group of CSI-RS port serial numbers and the second group of CSI-RS port serial numbers are spaced by the third group of CSI-RS port serial numbers, and the third group of CSI-RS port serial numbers and the fourth group of CSI-RS port serial numbers are spaced by the second group of CSI-RS port serial numbers; and
    receive Channel State Information (CSI) measured by User Equipment (UE) on the basis of the CSI-RS.

10. The device according to claim 9, wherein the serial numbers of the 16 CSI-RS ports are sequentially 15, 16, 17, 18, 19, 20, 21, 22, 23, 24, 25, 26, 27, 28, 29 and 30.

11. The device according to claim 9, wherein two continuous CSI-RS port serial numbers among the first group of CSI-RS port serial numbers are mapped to two REs located on a first subcarrier, and the other two continuous CSI-RS port serial numbers among the first group of CSI-RS port serial numbers are mapped to two REs located on a second subcarrier, wherein the first subcarrier and the second subcarrier are spaced by 5 subcarriers, and are two subcarriers among 4 subcarriers where the mapped REs for the CSI-RSs of the first group of 8 ports are located.

12. The device according to claim 11, wherein two continuous CSI-RS port serial numbers among the second group of CSI-RS port serial numbers are mapped to two REs located on a third subcarrier, and the other two continuous CSI-RS port serial numbers among the second group of CSI-RS port serial numbers are mapped to two REs located on a fourth subcarrier, wherein the third subcarrier and the fourth subcarrier are spaced by 5 subcarriers, and are the other two subcarriers among the 4 subcarriers where the mapped REs for the CSI-RSs of the first group of 8 ports are located.

13. The device according to claim 9, wherein two continuous CSI-RS port serial numbers among the third group of CSI-RS port serial numbers are mapped to two REs located on a fifth subcarrier, and the other two continuous CSI-RS port serial numbers among the third group of CSI-RS port serial numbers are mapped to two REs located on a sixth subcarrier, wherein the fifth subcarrier and the sixth subcarrier are spaced by 5 subcarriers, and are two subcarriers among 4 subcarriers where the mapped REs for the CSI-RSs of the second group of 8 ports are located.

14. The device according to claim 13, wherein two continuous CSI-RS port serial numbers among the fourth group of CSI-RS port serial numbers are mapped to two REs located on a seventh subcarrier, and the other two continuous CSI-RS port serial numbers among the fourth group of CSI-RS port serial numbers are mapped to two REs located on an eighth subcarrier, wherein the seventh subcarrier and the eighth subcarrier are spaced by 5 subcarriers, and are the other two subcarriers among the 4 subcarriers where the mapped REs for the CSI-RSs of the second group of 8 ports are located.

15. The device according to claim 9, wherein the first group of CSI-RS port serial numbers and the third group of CSI-RS port serial numbers form 8 continuous CSI-RS port serial numbers corresponding to 8 antennae or 8 radio frequency channels in a first polarization direction; and the second group of CSI-RS port serial numbers and the fourth group of CSI-RS port serial numbers form 8 continuous CSI-RS port serial numbers corresponding to 8 antennae or 8 radio frequency channels in a second polarization direction.

16. The device according to claim 15, wherein 4 antennae or 4 radio frequency channels which correspond to the first group of CSI-RS port serial numbers and of which a polarization direction is the first polarization direction and 4 antennae or 4 radio frequency channels which correspond to the second group of CSI-RS port serial numbers and of which a polarization direction is the second polarization direction are at a first perpendicular location, and 4 antennae or 4 radio frequency channels which correspond to the third group of CSI-RS port serial numbers and of which a polarization direction is the first polarization direction and 4 antennae or 4 radio frequency channels which correspond to the fourth group of CSI-RS port serial numbers and of which a polarization direction is the second polarization direction are at a second perpendicular location.

* * * * *